(12) United States Patent
Passler et al.

(10) Patent No.: US 12,372,606 B1
(45) Date of Patent: Jul. 29, 2025

(54) GEO-LOCATING OF WIRELESS DEVICES USING SUM OF ROUND TRIP TIME AND ANGLE OF ARRIVAL SQUARED RESIDUALS

(71) Applicant: SR Technologies, Inc., Sunrise, FL (US)

(72) Inventors: Mark Passler, Rockville, MD (US); Kyle Patrick Kelly, Palm Beach Gardens, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 19/096,263

(22) Filed: Mar. 31, 2025

Related U.S. Application Data

(63) Continuation of application No. 18/936,682, filed on Nov. 4, 2024, now Pat. No. 12,298,421.

(60) Provisional application No. 63/597,421, filed on Nov. 9, 2023.

(51) Int. Cl.
    *G01S 5/02*     (2010.01)
    *G01S 5/12*     (2006.01)

(52) U.S. Cl.
    CPC ............. *G01S 5/0284* (2013.01); *G01S 5/12* (2013.01)

(58) Field of Classification Search
CPC ........ G01S 5/0205; G01S 5/0244; G01S 5/10; G01S 5/021; G01S 5/0278; G01S 5/12; G01S 5/0036; G01S 5/0284; G01S 5/00; G01S 5/0249; H04W 64/00; H04W 4/025; H04W 4/33
See application file for complete search history.

(56) References Cited

U.S. PATENT DOCUMENTS 12,149,935 B1 * 11/2024 Monteagudo Notario ................. H04W 12/069
2017/0041750 A1 * 2/2017 Jose ....................... G01S 5/0244

* cited by examiner

*Primary Examiner* — Olumide Ajibade Akonai
(74) *Attorney, Agent, or Firm* — Goodwin Procter LLP

(57) ABSTRACT

A method for determining a geo-location of a target station. The method includes transmitting a plurality of ranging packets to a target station and receiving a plurality of response packets transmitted by the target station in response. A plurality of round-trip times (RTTs) are determined based on the ranging packets and the response packets. A plurality of angles of arrival (AOAs) are determined based on the response packets. First and second pluralities of squared residuals are calculated for the plurality of RTTs and the plurality of AOAs, respectively. A third plurality of squared residuals is generated by summing the first and second pluralities. A minimum of a sum of the third plurality is calculated to identify best-fit location parameters for the target station. A circular error probability (CEP) ellipse is generated using the best-fit location parameters and a geo-location of the target station is determined based on the CEP ellipse.

20 Claims, 6 Drawing Sheets

GEO-LOCATING OF WIRELESS DEVICES USING SUM OF ROUND TRIP TIME AND ANGLE OF ARRIVAL SQUARED RESIDUALS

CROSS-REFERENCE TO RELATED APPLICATIONS

This application is a continuation of U.S. patent application Ser. No. 18/936,682, filed on Nov. 4, 2024 and titled "GEO-LOCATING OF WIRELESS DEVICES USING SUM OF ROUND TRIP TIME AND ANGLE OF ARRIVAL SQUARED RESIDUALS," which claims priority to and benefit of U.S. Provisional Application No. 63/597,421, filed on Nov. 9, 2023 and titled "GEO-LOCATING OF WIRELESS DEVICES USING SUM OF ROUND TRIP TIME AND ANGLE OF ARRIVAL SQUARED RESIDUALS," the entire contents of each of which are hereby incorporated by reference.

TECHNICAL FIELD

The present disclosure relates to geo-location of wireless devices, and in particular to a method and system for determining the geo-location of wireless local area network (WLAN) devices.

BACKGROUND

Initially, it is noted that Institute of Electrical and Electronics Engineers (IEEE) Standard 802.11-2020 is used as a reference for disclosures used herein, the entire contents of which are incorporated herein by reference. The IEEE 802.11-2020 Standard is commonly referred to as "Wi-Fi" and is referred to as such herein.

The locations of wireless devices can be determined by various methods. These methods may be classified as active, passive, and combined active and passive. In an active location scheme, a device that is determining the location or range (i.e., a measuring device) transmits certain packets, referred to as "ranging packets," to the device being located (i.e., a target device). One method for determining the location is to measure the time of arrival (TOA) of the response packet from the target device and compare that to the time of departure (TOD) of the ranging packet that was transmitted by the measuring device to determine the round-trip time (RTT). Another method is to determine the direction from which the response signal from the target device is received, the angle of arrival (AOA).

FIG. 1 is a diagram that illustrates an example method that may be used to communicate ranging and response packets between two wireless devices, such as wireless device STA A 100 and wireless device STA B 105. Time axis 110 refers to the time axis for STA A 100 and time axis 120 refers to the time axis for STA B 105. At time T1 111, STA A 100 transmits a ranging packet 112 to STA B 105. Ranging packet 112 is received at STA B 105 at time T2 113. STA B 105 then transmits a response packet 124 at time T3 123 after a turnaround time 122. At time T4 114, STA A 100 receives the response packet 124 from STA B 105. Examples of ranging packet 112 include a "request to send" (RTS) or a data null, and response packets 124 include a "clear to send" (CTS) or an "acknowledgement" (Ack).

FIG. 2 is a diagram that describes in further detail the communication between STA A 100 and STA B 105. Time axis 210 is the time axis for STA A 100 and time axis 220 is the time axis for STA B 105. At time Ta 211, STA A 100 starts the transmission of ranging packet 112 which is addressed to STA B 105 and ends the transmission at time Tc 213. At time Tb 212 STA B 105 starts to receive the ranging packet 112. At time Td 214, STA B 105 completes the reception of ranging packet 112. At time Te 221 STA B 105 starts to transmit the response packet 124. Te 221 is at time $t_{SIFS}$ 232 after time Td 214, where $t_{SIFS}$ is the short interframe spacing as defined in the IEEE 802.11-2020 Standard. At time Tf 222, STA A 100 starts to receive response packet 124 and at time Tg 223, STA A 100 completes receiving the response packet 124, the duration of the response packet 124 being Tres 225. Another ranging packet 112 may be transmitted by STA A 100 to STA B 105 at a time Tp 230 after time Ta 211. The time differences Tb-Ta and Tf-Te correspond to the propagation time between STA A 100 and STA B 105.

As mentioned previously, the packet exchange may be any pair of packets where an automatic response packet is sent. Commonly used packets in Wi-Fi include an RTS/CTS exchange and a Data (null)/Ack exchange.

In an RTT active location scheme, the TOD may be measured at time Tc 213 for a ranging packet that is transmitted from STA A 100, addressed to STA B 105. The TOA of the response from STA B 105 at STA A 100 is then measured at time Tg 223. If the turnaround time for STA B 105 to receive the packet from STA A 100 and to start to transmit the response is known, or is known to be a constant, then the time difference at STA A 100 between the TOA and the TOD, minus the duration of the response packet 124 and the turnaround time at STA B 105, will be directly proportional to twice the distance of the target station from the measuring station. For example, if STA B 105 is a wireless device based upon IEEE 802.11 technology, and if the ranging packet transmitted from STA A 100 to the target station is a data packet, the response from the STA B 105 will normally be an ACK packet. If the ranging packet transmitted from STA A 100 to STA B 105 is a control packet, for example an RTS packet, then the response from STA B 105 will normally be a CTS packet. In these two examples, the turnaround time at STA B 105 is defined in the IEEE 802.11-2020 Standard as the short interframe spacing (SIFS), which is a preset value. Hence, the RTT between STA A 100 and STA B 105, may be determined from equation (1):

$$RTT = (Tg - Tc - t_{SIFS} - \text{Tres}) \qquad (1).$$

The distance between STA A 100 and STA B 105 is then RTT*c/2, where c is the speed of light in vacuum.

In addition to determining the RTT, the AOA of the received response packets 124 may be measured at STA A 100. The AOA of a signal is the direction from which the signal is received. The AOA of the response packets 124 received by STA A 100 from STA B 105 indicates the direction of STA B 105 relative to STA A 100. AOA may be measured by various schemes. The AOA of a signal may be measured using a switched beam antenna (SBA). By selecting individual antennas, or groups of antennas, an SBA can be configured to be a directional antenna of variable beamwidths. The basic objective is to select the narrowest beam antenna that is receiving the highest signal strength and thus is pointing in the direction of the target, providing an AOA. In order to measure AOAs in an accurate and timely fashion, the relative timing of the transmissions and receptions of the ranging packets 112 and the response packets 124 need to be aligned with the timings of the selections of the antenna combinations of the SBA. In one method using an SBA, bursts of ranging and response packets, 112 and 124 respectively, are used such that the received signal strengths of the response packets 124 may be averaged in order to derive a more accurate AOA than it would be by using single packet exchanges.

STA A 100 may be a mobile station that is transmitting ranging packets 112 either continuously spaced at Tp 230 or in bursts of N transmissions, each transmission within the burst being spaced at Tp 230. STA A 100 may be measuring the RTT corresponding to its own location (latitude, longitude, altitude). Based upon a set of measured RTTs and corresponding STA A 100 locations, and with knowledge of the ground elevation of the target station (i.e., STA B 105), STA A 100 can estimate the distances to STA B 105. RTT measurements, however, may exhibit variations due to noise, weak signal strengths, and, in part, the timing accuracy of the clock at STA B 105 and STA A 100. In addition, many Wi-Fi devices do not use the correct SIFS times consistent with the IEEE 802.11-2020 Standard. Therefore, in order to derive an estimated position for STA B 105, the determination of a best-fit to the RTT measurements is required.

Similarly, the measurements of the AOAs of the response packets 124 may exhibit variations due to noise, multipath, obstructions, and the like. Based upon a set of measured AOAs and corresponding STA A 100 locations, STA A 100 can estimate the angles to STA B 105. In order to derive an estimated location for the target station 105, the determination of a best-fit to the AOA measurements is required.

The fitting of models to data when the equations are non-linear is a well-developed discipline. The typical method for fitting RTT and AOA measurements to a target position is by use of minimization of the summation of the squared residuals (SSR). Hence, the location of STA B 105, may be estimated at STA A 100 by either RTT or AOA measurements. However, each scheme can be susceptible to inaccuracies due to independent conditions. For example, the RTT scheme is generally less accurate if the target is at a short distance due to the timing accuracy. Meanwhile, the AOA scheme becomes less accurate at greater distances due to the beamwidth of the angle subtending greater distances. Hence, methods to combine the RTT and AOA results are of interest. Methods based upon combinations of the RTT and AOA measurements rather than two locations based on the individual results (i.e., RTT or AOA measurements) may produce a more accurate location determination over a greater range of conditions.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

In various examples, the subject matter described herein relates to determining a location of a wireless device. According to some embodiments, a measuring station transmits a plurality of ranging packets to a target station and receives a plurality of response packets transmitted by the target station in response to the plurality of ranging packets. A plurality of round-trip times (RTTs) are determined based on the plurality of ranging packets and the plurality of response packets. A plurality of angles of arrival (AOAs) are determined based on the plurality of response packets. A first plurality of squared residuals are calculated for the plurality of RTTs. A second plurality of squared residuals are calculated for the plurality of AOAs. A third plurality of squared residuals are generated by summing the first and second pluralities. A minimum of a sum of the third plurality is calculated to identify best-fit location parameters for the target station. A circular error probability (CEP) ellipse is generated using the best-fit location parameters for the target station and a geo-location of the target station is determined based on the CEP ellipse.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
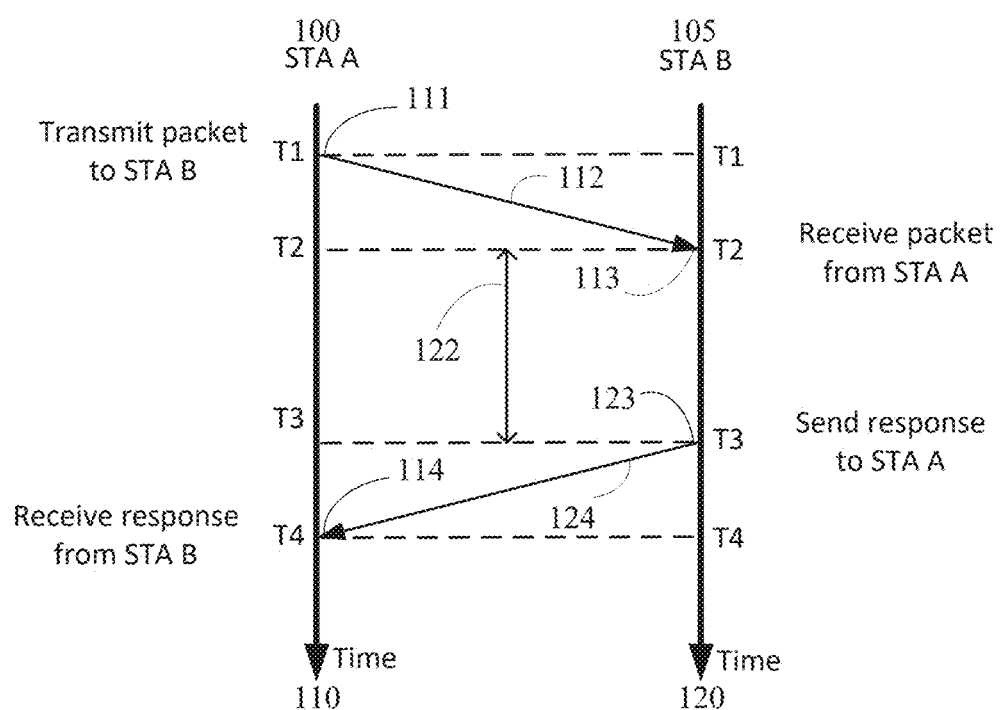
FIG. 1 is a diagram depicting a method for communicating between two wireless devices, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Methods and devices are disclosed that determine the geo-location of a target station, using an approach that combines the fitting process of two sets of measured data, RTT and AOA. Although when used independently both methods have proven to be successful, under strenuous conditions each method alone can become susceptible to error, yielding inaccurate and inconsistent results. The systems and methods disclosed herein combine AOA measurements with RTT measurements to create geo-location vectors, which are used to increase the accuracy in target location determinations and improve the stability of the resulting confidence ellipse, known as the circular error probability (CEP) ellipse, under conditions of blocked and multipath propagations.

It should be noted that in the following descriptions, the term "measuring station 100" refers to and is interchangeable with STA A 100. Similarly, the term "target station 105" refers to and is interchangeable with STA B 105.

Figure 2:
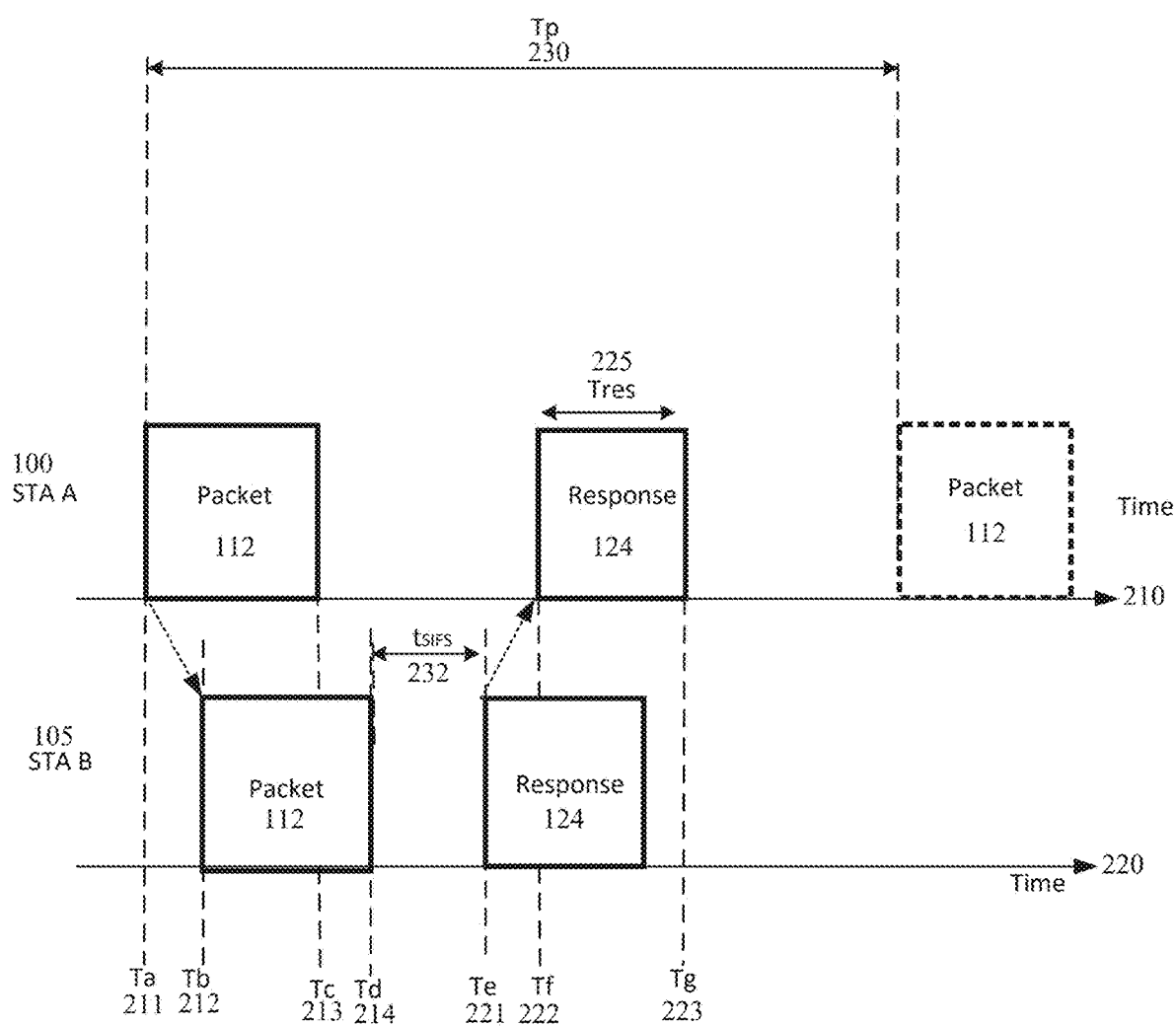
FIG. 2 is a diagram depicting further detail of the communication between the wireless devices of FIG. 1, in accordance with some embodiments.

As described above with reference to FIG. 2, based upon a set of measured RTTs corresponding to known measuring station 100 positions, and with knowledge of the ground elevation of the target station 105, the measuring station 100 may estimate the location of target station 105. Similarly, based upon a set of measured AOAs corresponding to known measuring station 100 positions, and with knowledge of the ground elevation of the target station 105, the measuring station 100 may estimate the location of the target station 105. In each case, the best-fit of the data may be used to determine the location of target station 105.

A more complete understanding of the present disclosure, and the attendant advantages and features thereof, will be more readily understood by first describing the conventional method for fitting RTT measurements to a target position by use of minimization of the summation of the squared residuals (SSR).

Assume there are N measurements with index i, of the RTT, $y_i$, from the measuring station 100 to the target station 105. For an arbitrary target location, the RTT may be modelled by a function $f(x_1, a)$ where vectors $x_i$ are the known positions of the measuring station 100 (e.g., in terms of latitude $x_i^{LAT}$, longitude $x_i^{LON}$, and altitude $x_i^{ALT}$), and where parameter vector $\alpha$ defines the location of the target station 120 (e.g., in terms of latitude $\alpha^{LAT}$, longitude $\alpha^{LON}$, and altitude $\alpha^{ALT}$), plus other parameters, such as a turnaround offset $\alpha^{OFF}$. It is noted that $\alpha^{OFF}$ may be expressed in terms of distance corresponding to the turnaround time (e.g., SIFS) of the target station 105, plus any error.

The target location and offset parameters, $\alpha^{LAT}$, $\alpha^{LON}$, $\alpha^{ALT}$, and offset $\alpha^{OFF}$, may be determined by first defining a square residual, $SR(rtt)_i$. $SR(rtt)_i$ is the square of the difference between the measurement of RTT, $y_i$, and the computation of total travel time, $f(x_i, \alpha)$, as shown in equation (2):

$$SR(rtt)_i = [y_i - f(x_i, \alpha)]^2 \qquad (2).$$

In equation (2), $[y_i - f(x_i, \alpha)]$ is the residual, $R(rtt)_i$, defined as the difference of the RTT, $y_i$, from the computed distance multiplied by the factor $(2/c)$ and modified by the turnaround offset $\alpha^{OFF}$ to convert the distance to a model RTT, as shown by equation (3):

$$f(x_i, \alpha) = \frac{2}{c}\left(\alpha^{OFF} + d(x_i, \alpha)\right). \qquad (3)$$

The term $d(x_i, \alpha)$ in equation (3) is calculated using equation (4), shown below:

$$d(x_i, \alpha) = \left[\left(x_i^{LAT} - \alpha^{LAT}\right)^2 + \left(\left(x_i^{LON} - \alpha^{LON}\right) * \cos(x_i^{LAT})\right)^2 + \left(x_i^{ALT} - \alpha^{ALT}\right)^2\right]^{\frac{1}{2}}. \qquad (4)$$

It is further noted that the speed of light c is expressed in units of geographic distance divided by the units of RTT. For example, if latitude and longitude are used for location and microseconds are used for RTT, then c=0.0027027 degrees/microsecond. Longitude distances are scaled by the cosine of the latitude to account for spherical coordinates. Additionally, all distances are sufficiently small to use planar approximation.

If the errors in the RTT measurements are Gaussian, then the best value for the target location parameters, $\alpha$, may be obtained by minimizing the sum of the squared residuals $(SSR(rtt) = \Sigma_i S\, R(rtt)_i)$ which is defined by setting the gradient of the SSR to zero, as shown in equation (5):

$$0 = \nabla_\alpha(\Sigma_i S\, R_i) = -2\Sigma_i [y_i - f(x_i, \alpha_i)][\nabla_\alpha f(x_i, \alpha)] \qquad (5).$$

A Jacobian $J_{i\alpha}$ may be defined as $J_{i\alpha} = \nabla_\alpha f(x_i, \alpha)$. In some examples, the Jacobian $J_{i\alpha}$ is utilized to define the direction to the minimum, known as the Steepest Descent method. In some examples, the Jacobian $J_{i\alpha}$ is utilized to define the direction and step size to the minimum, known as the Gauss-Newton method. In further examples, the Jacobian $J_{i\alpha}$ is utilized to define the end stage direction and step size to the minimum, known as the Levenberg-Marquardt method.

Once this minimum is found, the CEP ellipse can be found using the Jacobian $J_{i\alpha}$ evaluated with the parameter values determined by the best-fit. To find the CEP ellipse, a Hessian $H_{\alpha'\alpha}$ may approximately be defined by equation (6):

$$H\alpha'\alpha = \Sigma_i J_{i\alpha}{}^T J_{i\alpha} \qquad (6).$$

A correlation matrix Pa'g can then be defined as the inverse of the Hessian $H_{\alpha'\alpha}$, as shown in equation (7):

$$\beta_{\alpha'\alpha} = H_{\alpha'\alpha}{}^{-1} \qquad (7)$$

Then a CEP ellipse, comprising length, width, and orientation ($\theta$), may be defined for the resulting location according to Table 1:

TABLE 1

| | Location Confidence Ellipse parameters |
|---|---|
| Length | Length$^2$ = $\rho_{00}$ * Cos($\theta$) + $\rho_{11}$ * Sin($\theta$) * Sin($\theta$) + 2 * $\rho_{01}$ * Cos($\theta$) * Sin($\theta$) |
| Width | Width$^2$ = $\rho_{11}$ * Cos($\theta$) * Cos($\theta$) + $\rho_{00}$ * Sin($\theta$) * Sin($\theta$) 2 * $\rho_{01}$ * Cos($\theta$) * Sin($\theta$) |
| Orientation | Tan(2$\theta$) = 2 * $\rho_{01}/(\rho_{00} - \rho_{11})$ |

As discussed above, a conventional technique to determining the best-fit to function, $f(x_i, \alpha)$, is to minimize the SSR, also known as the least squared residuals. For non-linear functions, such as $f(x_i, \alpha)$, there are various iterative methods that may be utilized including those known as Steepest Descent, Gauss-Newton, and Levenberg-Marquardt.

Similarly, the method for fitting the AOA measurements to a target position is achieved by minimizing the SSR.

Assuming there are N measurements with index i of the AOA, $\phi_i$, from the measuring station 100 to the target station 105, for an arbitrary target location, the AOA may be modelled by a function $f(x_i, \beta)$ where vectors $x_i$ are the known positions of the measuring station 100 (e.g., in terms of latitude $x_i^{LAT}$, longitude $x_i^{LON}$, and altitude $x_i^{ALT}$), and where parameter vector $\beta$ defines the AOA of the signal from target station 105.

The target AOA may be determined by first defining a square residual, $SR(\alpha o\alpha)_i$ where $SR(aoa)_i$ is the square of the difference between the measurement of AOA, $\phi_i$, and the computation of modelled AOA, $f(x_i, \beta)$, as shown in equation (8) below:

$$SR(\alpha o\alpha)_i=[\phi_i-f(x_i,\beta)]^2 \qquad (8).$$

In equation (8), the term $[\theta_i-f(x_i, \beta)]$ is the residual $R(\alpha o\alpha)_i$ defined as the difference of the measured AOA $\theta_i$, from the computed AOA, and the term $f(x_1, \beta)$ as defined by equation (9):

$$f(x_i, \beta) = \text{ATAN}\left(\frac{(\alpha^{LON} - x_i^{LON})*\cos(x_i^{LAT})}{(\alpha^{LAT} - x_i^{LAT})}\right). \qquad (9)$$

Similar to that for the RTTs, if the errors in the AOA measurements are Gaussian, then the best value for the target AOA parameters, $\beta$, may be obtained by minimizing the SSR, which is defined by setting the gradient of the SSR to zero. Once this minimum is found, the CEP ellipse comprising length, width, and orientation ($\theta$) may be defined similar to the method discussed above for RTTs.

When considering the RTT measurements, the spurious response packets can occur from devices that do not correctly obey the IEEE 802.11-2020 Standard, and it is possible to receive response packets from such devices when the ranging packets 112 are not addressed to those devices. In addition, in the event of very weak signal levels, when correlation methods are in use for the detection of the response packet 124, it is possible to falsely detect a response packet. In the presence of such spurious RTT measurements, the use of the SSR technique to determine a best-fit can produce errors in the estimated location of the target station 105. A "Passfilter" method maximizes the data count fitting to a model, rather than minimizing the distance between a model and the data, as is the case with the SSR method. This Passfilter method is designed to accommodate the two cases discussed above for outliers and for corrupt data sets. The Passfilter method defines a "fit probability" (FP) function that measures how well each data point fits the model.

The FP function, $FP_i$, is defined in equation (10):

$$FP_i=e^{-|y_i-f(x_i,\alpha)|/\sigma} \qquad (10).$$

In equation (10), $\sigma$ is the standard deviation of $y_i$ for fixed $x_i$.

The model parameters can be found by maximizing the sum of fit probability (SFP) for all the data, as shown in equation (11):

$$SFP=\Sigma_i FP_i=E_i e^{-|y_i-f(x_i,\alpha)|/\sigma} \qquad (11).$$

In some examples, in place of defining an FP, a miss or non-fit probability, $MP(rtt)_i$, can be calculated as shown in equation (12):

$$MP(rtt)_i=1-e^{-|y_i-f(x_i,\alpha)|/\sigma} \approx |y_i-f(x_i,\alpha)| \qquad (12).$$

In equation (12), the final approximation $|y_i-f(x_i, \alpha)|$ is the result of replacing the exponential function with the first two Taylor series terms, which is valid when $|y_i-f(x_i, \alpha)| << \sigma$.

It is noted that the approximation for $MP(rtt)_i$ in equation (12) is the same as the residual $R(rtt)_i$ used in equation (2) above, which implies that a method similar to the minimization of SSR method, as described above, may be used for the $MP(rtt)_i$ by utilizing the minimization of sum of squared miss probabilities (SSMP) as shown in equation (13):

$$SSMP(rtt)=\Sigma_i MP(rtt)_i^2=\Sigma_i[1-e^{-|y_i-f(x_i,\alpha)|/\sigma}]^2 \qquad (13).$$

Figure 3:
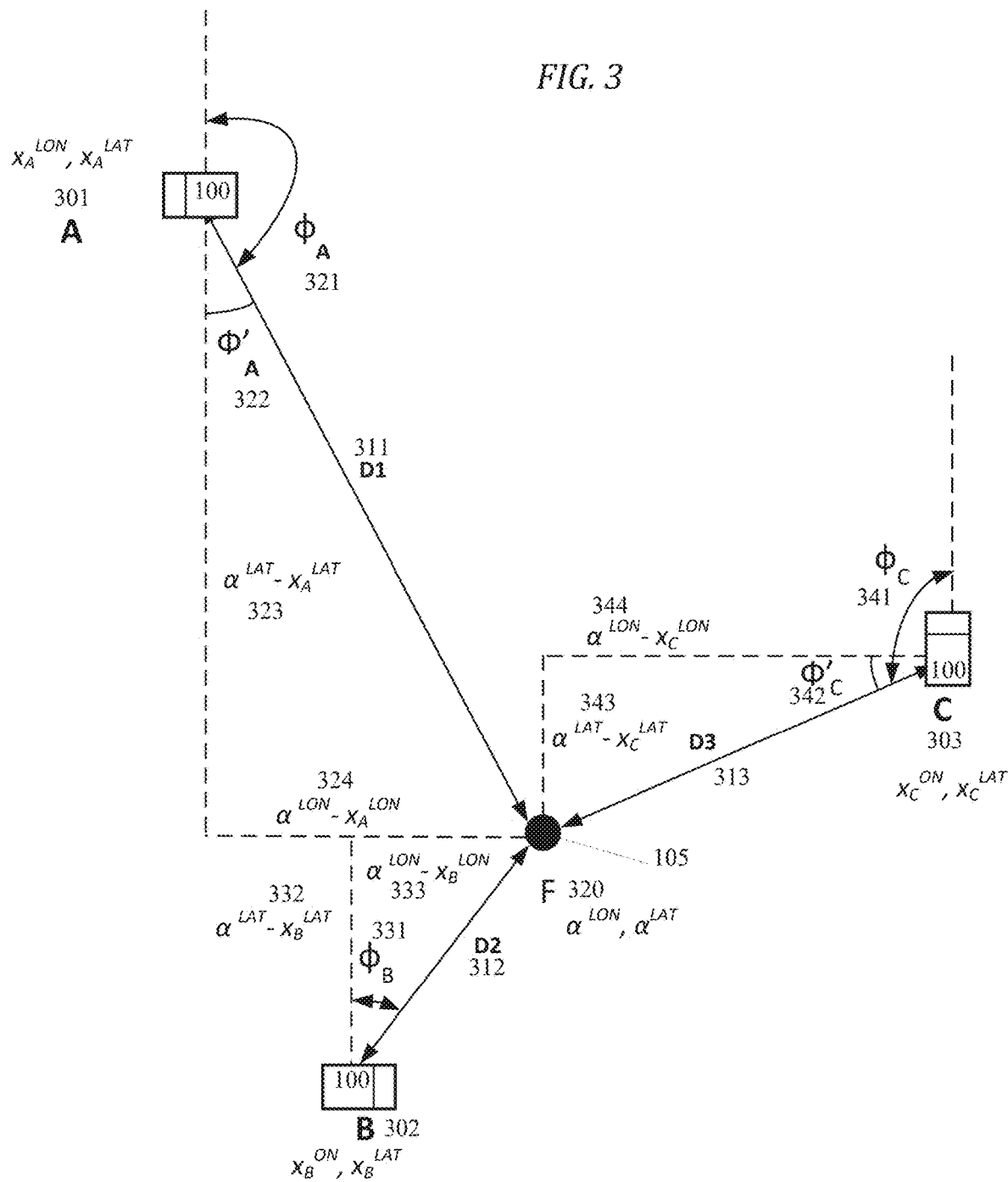
FIG. 3 is an example scenario where a single measuring station is used to determine the location of a target station, in accordance with some embodiments.

FIG. 3 is a schematic diagram of an example location scenario where a single measuring station 100 is used. In this scenario, measuring station 100 is depicted in three positions, A 301, B 302, and C 303 but may be visualized as moving in an area around the target station 105 at a location F 320. The measuring station 100 transmits ranging packets 112 continuously as it moves around the target station 105 and measures RTT and AOA. For example, the distance of the target station 105 from the measuring station 100, when the measuring station 100 is at position A 301, is D1 311. The distance of the target station 105 from the measuring station 100, when the measuring station 100 is at position B 302, is D2 312. The distance of the target station 105 from the measuring station 100, when the measuring station 100 is at position C 303, is D3 313. As discussed above with reference to equation (1), RTT measurements taken when the measuring station 100 is, for example, at positions A 301, B 302, and C 303 will yield the distances D1 311, D2 312, and D3 313. In this example, the scenario may be considered to be relatively flat (i.e., at a constant altitude), the altitude terms are omitted to reduce the complexity.

From equations (2) and (3), the SR(rtt) is expressed by equation (14) below:

$$SR(rtt) = \left[RTTi - \frac{2}{c}\left(\alpha^{OFF} + \sqrt{(x_i^{LAT} - a^{LAT})^2 + ((x_i^{LON} - \alpha^{LON})*\cos(x_i^{LAT}))^2}\right)\right]^2. \qquad (14)$$

Referring again to FIG. 3, at position A 301, the latitude and longitude of the measuring station 100 is $x_A^{LAT}, x_A^{LON}$. Similarly, at position B 302, the latitude and longitude of the measuring station 100 is $x_B^{LAT}, x_B^{LON}$; and at position C 303, the latitude and longitude of the measuring station 100 is $x_C^{LAT}, x_C^{LON}$. The target station 105 is located at location F 320, with respective latitude and longitude $\alpha^{LON}$ and $\alpha^{LAT}$. Thus, when measuring station 100 is at position A 301, it may record an $RTT_A$ corresponding to the distance D1 311 and represented by equation (15):

$$D1 = \sqrt{(a^{LAT} - x_A^{LAT})^2 + ((\alpha^{LON} - x_A^{LON})*\cos(x_A^{LAT}))^2} = c/2(RTT_A) - \alpha^{OFF}. \qquad (15)$$

Similarly, at position B 302, the measuring station 100 may record an $RTT_B$ corresponding to the distance D2 312 and represented by equation (16):

$$D2 = \sqrt{(a^{LAT} - x_B^{LAT})^2 + ((\alpha^{LON} - x_B^{LON})*\cos(x_B^{LAT}))^2} = c/2(RTT_B) - \alpha^{OFF}. \qquad (16)$$

And at position C 303, the measuring station 100 may record an $RTT_C$ corresponding to the distance D3 313 and represented by equation (17):

$$D3 = \sqrt{(\alpha^{LAT} - x_C^{LAT})^2 + ((\alpha^{LON} - x_C^{LON}) * \cos(x_C^{LAT}))^2} = c/2(RTT_C) - \alpha^{OFF}. \quad (17)$$

To find the minimum SSR(rtt), and the best-fit, the values of $\alpha^{LAT}$, $\alpha^{LON}$, $\alpha$OFF are varied.

As discussed above with reference to equations (10), (12), and (13), an alternative method may be used to find the best-fit, the "Passfilter" method. Hence, using the Passfilter, from equation (13), the SMP(rtt) is:

$$SMP(rtt) = \left|1 - e^{-\frac{RTT_i - \frac{2}{c}\left(a^{OFF} + \sqrt{(x_i^{LAT} - a^{LAT})^2 + ((x_i^{LON} - a^{LON})*\cos(x_i^{LAT}))^2}\right)}{\sigma}}\right|^2. \quad (18)$$

To find the minimum SSMP(rtt) (where SSMP(rtt)=>$\Sigma_i$ SMP(rtt)$_i$) and the best-fit, the values of $\alpha^{LAT}$, $\alpha^{LON}$, $\alpha^{OFF}$ are varied.

Referring again to FIG. 3, AOA measurements, relative to north, $\phi_A$ 321, $\phi_B$ 331, and $\phi_C$ 341, may also be recorded when the measuring station 100 is at positions A 301, B 302, and C 303, respectively. In case where measuring station 100 is at position A 301, the AOA measurement $\phi_A$ 321 may be recorded together with the position of the measuring station 100—i.e., $x_A^{LAT}$, $x_A^{LON}$. In some examples, the AOA measurement $\phi_A$ 321 may be derived from the angle $\phi_A$ 322 which is represented as equation (19):

$$\phi'_A = ATAN\left(\frac{(\alpha^{LON} - x_A^{LON}) * \cos(x_A^{LAT})}{(\alpha^{LAT} - x_A^{LAT})}\right). \quad (19)$$

In equation (19), the term ($\alpha^{LON} - x_A^{LON}$) 324 is positive and the term ($\alpha^{LAT} - x_A^{LAT}$) 323 is negative, hence the result is a negative angle that requires correcting by adding It in order to obtain the AOA measurement $\phi_A$ 321 in radians.

The AOA measurement $\phi_B$ 331 is derived from equation (20):

$$\phi_B = ATAN\left(\frac{(\alpha^{LON} - x_B^{LON}) * \cos(x_B^{LAT})}{(\alpha^{LAT} - x_B^{LAT})}\right). \quad (20)$$

In equation (20), the term ($\alpha^{LON} - x_B^{LON}$) 333 is positive and the term ($\Delta^{LAT} - x_B^{LAT}$) 332 is also positive. Hence, no correction is required to obtain the AOA measurement oB 331.

The AOA measurement $\phi_C$ 341 may be derived from the angle $\phi'_C$ 342, which is represented by equation (21):

$$\phi'_C = ATAN\left(\frac{(\alpha^{LON} - x_C^{LON}) * \cos(x_C^{LAT})}{(\alpha^{LAT} - x_C^{LAT})}\right). \quad (21)$$

In equation (21), the term ($\alpha^{LON} - x_C^{LON}$) 344 is negative and the term ($\alpha^{LAT} - x_C^{LAT}$) 323 is also negative. Hence, the result requires correcting by adding n in order to obtain the AOA measurement $\phi_C$ 341 in radians. From equations (8) and (9), the SR($\alpha o \alpha$) is represented by equation (22) below:

$$SR(aoa) = \left(AOA_i - ATAN\left(\frac{(\alpha^{LON} - x_i^{LON}) * \cos(x_i^{LAT})}{(\alpha^{LAT} - x_i^{LAT})}\right)\right)^2. \quad (22)$$

The angle resulting from the ATAN calculation is corrected where appropriate (i.e., when resulting in a negative value) by adding $\pi$.

In the case where the measured $AOA_i$ is 355 degrees and the calculated angle term is 5 degrees, the difference is only 10 degrees, but a simple subtraction would yield a result of 350 degrees. To overcome this roll-over effect, the following method may be used. First the sine of the angle is calculated and divided by 2. Then the arcsine of the result is calculated and multiplied by 2. Hence, the formula for the SR($\alpha o \alpha$) can be expressed by equation (23):

$$SR(aoa) = \left(2 * ASIN\left(SIN\left(\frac{AOA_i - ATAN\left(\frac{(\alpha^{LON} - x_i^{LON}) * \cos(x_i^{LAT})}{(\alpha^{LAT} - x_i^{LAT})}\right)}{2}\right)\right)\right)^2. \quad (23)$$

In some examples, the sum of the SR(rtt) (represented by equation (14)) and the SR($\alpha o \alpha$) (represented by equation (23)) is used as the combined SR (SR$_f$(sum)). Thus, both the RTT and the AOA readings can be incorporated below as shown in equation (24):

$$SR_{i1}(sum) = \left[RTT - \frac{2}{c}\left(\alpha^{OFF} + \sqrt{(x_i^{LAT} - a^{LAT})^2 + ((x_i^{LON} - a^{LON})*\cos(x_i^{LAT}))^2}\right)\right]^2 + F\left(2 * ASIN\left(SIN\left(\frac{AOA_i - ATAN\left(\frac{(a^{LON} - x_i^{LON}) * \cos(x_i^{LAT})}{(a^{LAT} - x_i^{LAT})}\right)}{2}\right)\right)\right)^2. \quad (24)$$

In some examples, the scaling factor F of equation (24) is applied to SR(αoα) such that the contributions of SR(rtt) and SR(αoα) to the sum, $SR_{i1}$, are substantially balanced.

In some examples, the sum of the MP(rtt) (represented by equation (18)) and the SR(αoα) (represented by equation (23)) is used as the combined SR (SR$_2$(sum)). Thus, incorporating both the RTT and the AOA readings according to equation (25) below:

$$SR_{i2}(\text{sum}) = \left|1 - e^{-\frac{\left(RTT_i - \frac{2}{c}\left(a^{OFF} + \sqrt{(x_i^{LAT} - a^{LAT})^2 + ((x_i^{LON} - a^{LON})*\cos(x_i^{LAT}))^2}\right)\right)^2}{\sigma}}\right|^2 + \left(F\left(2*\text{ASIN}\left(\text{SIN}\left(\frac{AOA_i - ATAN\left(\frac{(a^{LON} - x_i^{LON})*\cos(x_i^{LAT})}{(a^{LAT} - x_i^{LAT})}\right)}{2}\right)\right)\right)\right)^2. \quad (25)$$

As discussed above with reference to equation (5), the best value for the target location parameters, a (i.e., $\alpha^{LON}$ and $\alpha^{LAT}$) may be obtained by minimizing the sum of the squared residuals, as shown by equation (26):

$$SSR(\text{sum}) = \Sigma_i S R(\text{sum})_i \quad (26).$$

In equation (26), the squared residuals SR (sum) i may be SR (sum) as provided in equation (24) or SR$_2$(sum) as provided in equation (25). As discussed above with reference to equations (10), (12), and (13), the "Passfilter" method used in SR$_2$(sum) (i.e., equation (25)) accommodates outliers and corrupt data sets, and hence, the use of SR$_2$(sum) may be preferred in some embodiments.

When the measuring station 100 is close to the target station 105 (e.g., less than 100 m), the AOA readings will tend to be more reliable than the corresponding RTT readings. This is because of the fixed timing accuracy associated with the RTT readings. When the measuring station 100 is further from the target station 105, (e.g., at 500 m), the RTT readings will tend to be more reliable than the corresponding AOA readings. This is because the distance subtended by the fixed angle error is larger as the distance increases. For example, an RTT accuracy of 0.1 μs, or 30 m, at a range of 100 m is a 30% error. Conversely, an AOA error of 0.13 radians, or 7.5 degrees, at a range of 100 m is only a 13 m error. On the other hand, at a range of 500 m, the RTT error is still 0.1 μs, or 30 m, corresponding to an error of 6%, whereas the AOA error of 0.13 radians corresponds to a 65 m error. From these examples, SR(rtt), or MP(rtt), and SR(aoa) are generally balanced when RTT is expressed in microseconds (μs) and AOA in radians. In order to allow for variations in RTT and AOA accuracy, a scaling factor F may be introduced as shown in equations (24) and (25). The value of factor F may also vary depending on the ranges at which the readings are collected. For example, if the measuring station 100 were airborne, the ranges would be greater than if it were on the ground.

FIG. 3 and equations (24) and (25) provide an example where the measuring station 100 and the target station 105 are at ground level, and hence, relatively close (e.g., up to 1000 m). The altitude terms present in equation (3) have been omitted to reduce complexity. It is further assumed that the measuring station 100 and the target station 105 are at the same altitude. In situations where the measuring station 100 is also airborne, the altitude of the measuring station should be also included.

Figure 4:
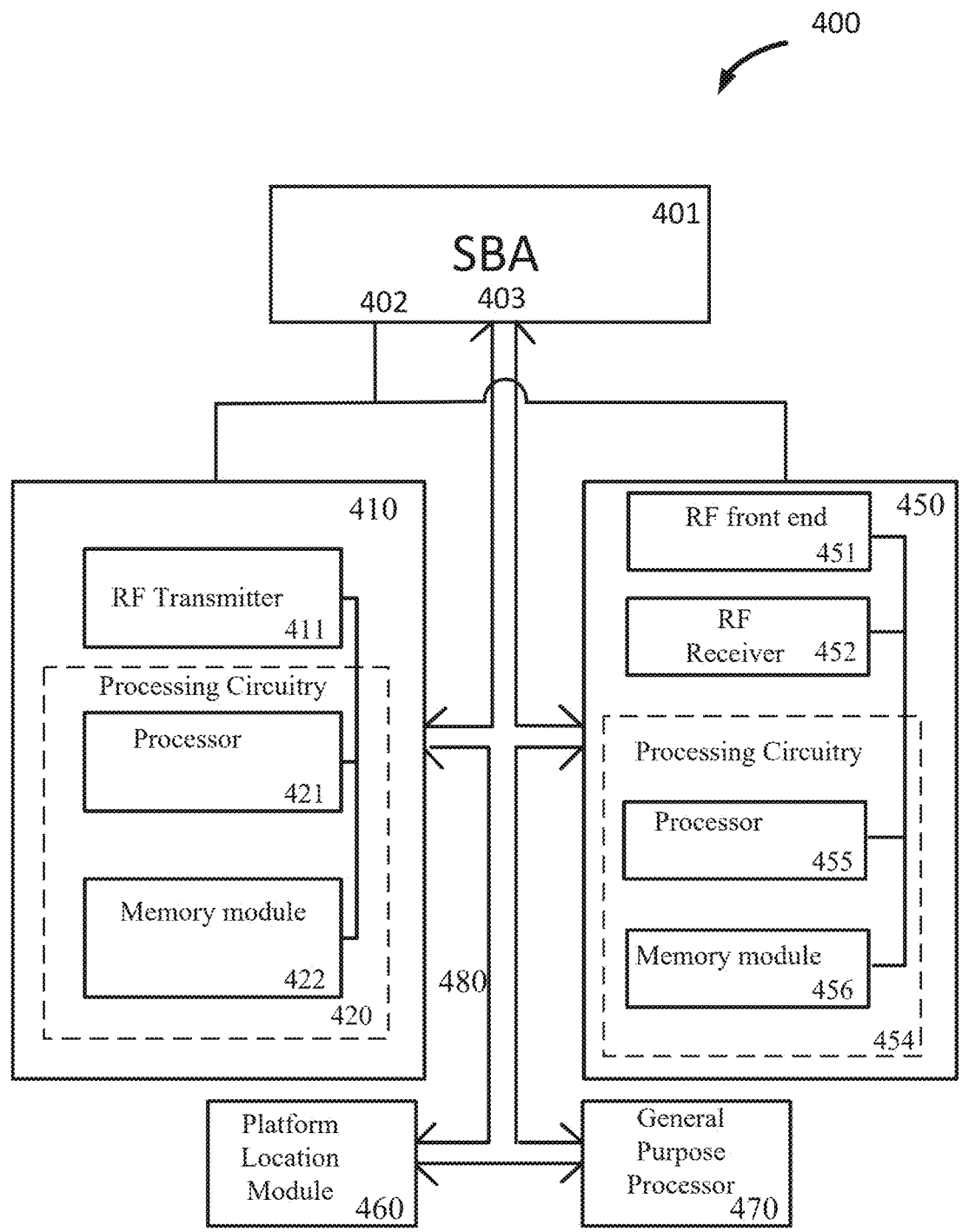
FIG. 4 is a block diagram of an example wireless communication device, in accordance with some embodiments.

FIG. 4 is a block diagram of an exemplary wireless communication device 400 which, according to at least one embodiment, may be used as the measuring station 100, or an integral part thereof. By way of example and not limitation, the wireless communication device 400 can be any device capable of wirelessly receiving signals and transmitting signals configured to execute any of the methods contemplated in the IEEE 802.11-2020 Standard. In some implementations, wireless communication device 400 can be one or more stations or access points. Additionally and/or alternatively, wireless communication device 400 can be one or more wireless devices that are based upon the IEEE 802.11-2020 Standard, with each device being configured to act as a transmitter or a receiver without limitation. In some embodiments described herein, the wireless communication device 400 includes an SBA 401, a wireless transmitter 410, and a wireless receiver 450. By way of example and not limitation, the wireless communication device 400 can also include a platform location module 460 and a general purpose processor 470 interconnected to the wireless transmitter 410, the wireless receiver 450, and the SBA 401 by a data bus 480. In some embodiments, the connection to the SBA 401 via communications connector 403 can be established via a separate data bus from the processing circuitry used to control the SBA 401—i.e., via processing circuitry 420 or 454, or the general purpose processor 470.

In some embodiments, the wireless transmitter 410 includes an RF transmitter 411 and processing circuitry 420 that includes a processor 421 and a memory module 422. The RF transmitter 411 may perform the functions of modulation, as described in IEEE 802.11-2020 Standard, and amplification for the transmission of Wi-Fi packets via the RF connector 402 and the SBA 401. In some embodiments, the processing circuitry 420 and/or the processor 421 include integrated circuitry to process and/or control, for example, one or more processors, processor cores, FPGAs (Field Programmable Gate Array), and/or ASICs (Application Specific Integrated Circuitry), each configured to execute programmatic software instructions. In some embodiments, the processing circuitry 420 performs the functions of the RF transmitter 411. The processing circuitry 420 can be configured to control any of the methods or processes described herein and to cause such methods or processes to be performed (e.g., by the RF transmitter 411). The memory module 422 can be configured to store data, programmatic software code, and/or other information described herein. In some embodiments, the software includes instructions that, when executed by the processing circuitry 420, cause the processing circuitry 420 to perform the processes described herein with respect to the wireless transmitter 410.

In some embodiments, the wireless receiver 450 includes an RF front end 451, an RF receiver 452, and processing circuitry 454 that includes a processor 455 and a memory module 456. The RF front end 451 can perform functions of an RF receiver front end, such as low noise amplification, filtering, and frequency down conversion so as to condition the received signal suitable for inputting to the RF receiver 452. The RF receiver 452 can perform the functions of demodulation of the Wi-Fi packets.

In some embodiments, the RF receiver 452 and/or the processing circuitry 454 include integrated circuitry to process and/or control, e.g., one or more processors, processor cores, FPGAs (Field Programmable Gate Array), and/or ASICs, each configured to execute programmatic software instructions. In some embodiments, the functions of the RF receiver 452 are performed by the processing circuitry 454. The processing circuitry 454 can be configured to control any of the methods or processes described herein and to cause such methods or processes to be performed, for example, by the wireless receiver 450. The memory module 456 is configured to store data, programmatic software code, and other information described herein. In some embodiments, the software includes instructions that, when executed by the processing circuitry 454, causes the processing circuitry 454 to perform the processes described herein with respect to the wireless receiver 450.

According to some embodiments, the wireless receiver 450 is configured to measure and monitor an input signal's attribute. For example, the wireless receiver 450, based upon the IEEE 802.11-2020 Standard, can measure and monitor attributes of (i) a signal transmitted by wireless transmitter 410, (ii) data and control packets, and/or (iii) the response signal (including control packets) that are transmitted by an access point or station. Such data and control packets may include data null, ACK, RTS, and CTS packets. The memory module 456 can store instructions for executing any method mentioned in the IEEE 802.11-2020 Standard, parameters for input signals (e.g., in the form of packet capture (or pcap), such as Wireshark), results processed by the processor 455, parameters for signals to be outputted, and the like. Processing circuitry 454 can output attributes of the response packets 124 to the general purpose processor 470, such as signal strength together with the antenna beam that was selected in the SBA 401, thus enabling the determination of the AOA of the response packet 124. Processing circuitry 454 can also output to the general purpose processor 470 attributes of the signals transmitted by wireless transmitter 410 (i.e., ranging packets 112), to enable the determination of the RTT between the wireless communication device 400 (i.e., the measuring station 100) and the target station 105.

In some embodiments, the RF transmitter 411 is configured to transmit signals and the processing circuitry 420 can be configured to prepare the transmitted signal attributes based upon the IEEE 802.11-2020 Standard. Such transmitted packets may include data packets, control packets, and management packets. Such control packets may include RTS packets. The memory module 422 may store instructions for executing any method mentioned in the specification, parameters for input signals, results processed by the processor 421, parameters for signals to be outputted, and the like.

According to some embodiments, the wireless receiver 450 is configured to receive the transmissions from another target station, e.g., target station 105, and the processing circuitry 454 may be configured to monitor an attribute of the transmissions from the other wireless communication device. The processing circuitry 454 determines the value of the signal strengths of packets from the other wireless communication device and the time of arrivals. The signal strengths may be used to determine the next antenna beam to be selected in SBA 401 and the derivation of the AOA.

According to some embodiments, the wireless transmitter 410 is configured to transmit bursts of ranging packets 112 to another wireless communication device, and the processor 421 is configured to prepare the attributes of the ranging packet 112 to be transmitted. The processor 421 may be configured to set the timing Tp 230 between each ranging packet 112 transmission, the number N of ranging packet 112 transmissions within each burst, a wait time Tw between bursts, as well as the start and stop times for the sequence of the bursts. During the wait time Tw, processor 421 may also be configured to set the SBA 401 to select an antenna beam for the next burst of transmissions.

According to some embodiments, the general purpose processor 470 is used to control the operations of the wireless communication device 400 and in particular the wireless transmitter 410 and wireless receiver 450. The general purpose processor 470 may provide an interface to a user via a keyboard, mouse, and display, allowing a user to select the attributes of the target station 105, control the start and stop times of the ranging packets 112, and interpret the resulting RTTs and AOAs. The general purpose processor 470 may also carry out the various calculations as described in this disclosure, such as determining a location for target station 105 based upon the resulting RTTs and AOAs, and may also prepare the measurement results to be presented to an operator or user. In some embodiments, the general purpose processor 470 may include integrated circuitry for processing and/or controlling, e.g., one or more processors, processor cores, FPGAs, and/or ASICs configured to execute programmatic software instructions, and may include a memory module to execute programmatic code stored in the general purpose processor or another device. The elements of the wireless communication device 400 can be included in a single physical device/housing or be distributed among several different physical devices/housings.

According to some embodiments, a platform location module 460 inputs the location of the platform that is carrying the wireless communication device 400, via the data bus 480, to the general purpose processor 470 and/or the processing circuitry 420 and/or 454. The platform location module 460 may include navigation equipment, such as a Global Positioning System (GPS) receiver and/or a gyroscope, and may provide both the location and heading direction of the wireless communication device 400 to the general purpose processor 470 and/or processing circuitries 420 and 454. The location and heading direction of the wireless communication device 400, together with the antenna selections of the SBA 401, the AOAs, and the measurements of RTT, may be used by the general purpose processor 470 to calculate and display the location of the target station 105.

Figure 5:
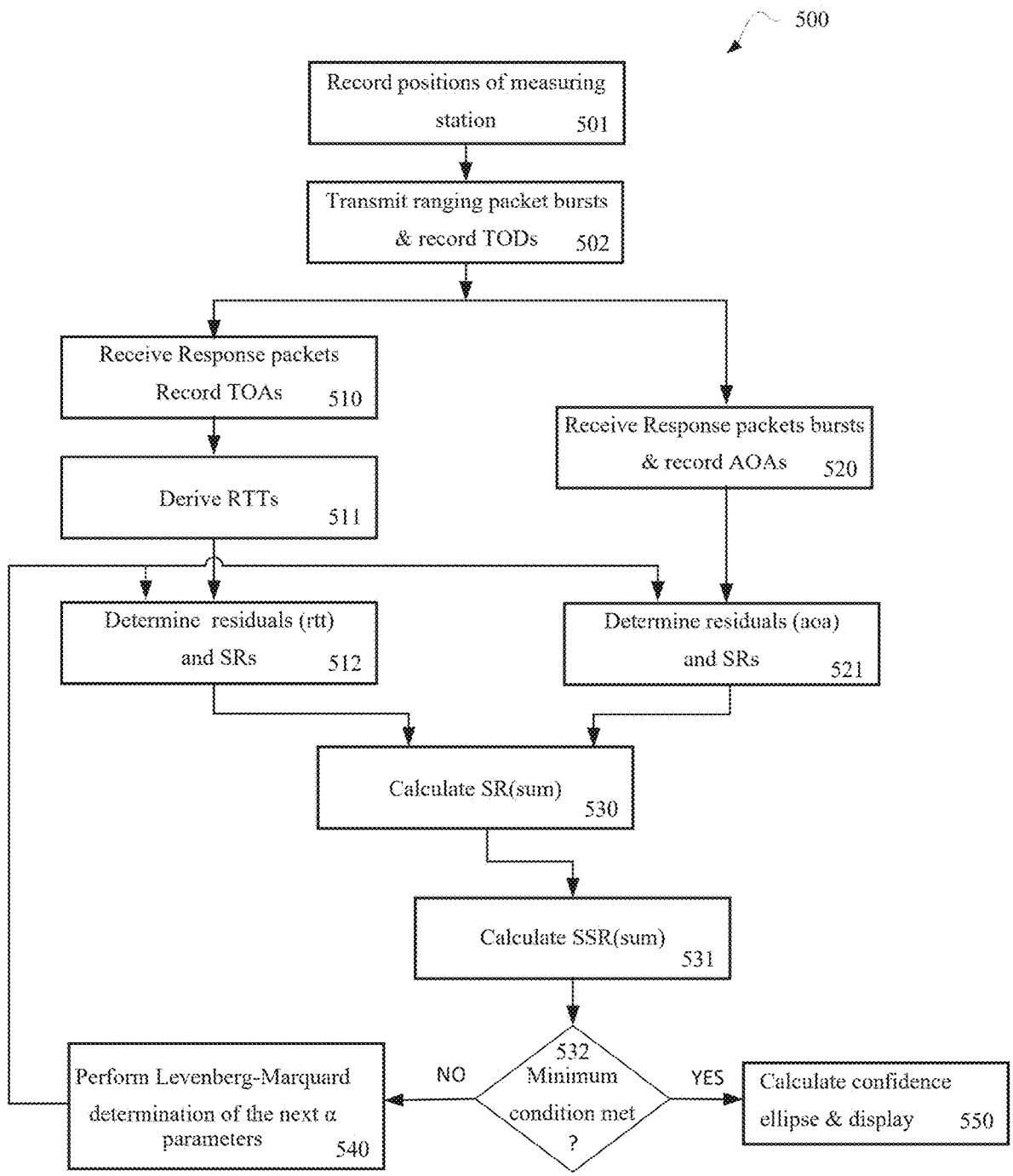
FIG. 5 is a flowchart of a method for determining the geo-location of a target station, in accordance with some embodiments.

FIG. 5 is a flowchart of a method 500, according to some embodiments, for determining the best-fit model for a set of RTTs and AOAs, and displaying the corresponding calculated CEP ellipse of the location of the target station 105.

At step 501, the location of the measuring target station 105 is recorded. The latitude, longitude, and optionally the altitude parameters may be obtained from the platform location module 460 and stored in the memory module 456 and/or the general purpose processor 470. At step 502, as discussed above with reference to FIG. 2, the measuring station 100 transmits a burst of ranging packets 112 and records the TODs of each packet. The bursts of ranging packets 112 may be set up by processing circuitry 420 and transmitted via RF transmitter 411 and SBA 401. The TODs may be received by wireless receiver 450 and recorded in processing circuitry 454. Step 502 may be followed by steps 510 and 520. In some examples, steps 510 and 520 are performed in parallel—i.e., concurrently. In some examples, steps 510 and 520 are performed serially.

At step 510 the corresponding response packets 124 are received and the TOAs are recorded. The response packets 124 may be received by wireless receiver 450 and the TOAs may be recorded in processing circuitry 454 together with the corresponding TODs and the position of the measuring station 100, as recorded in steps 501 and 502. At step 511, as discussed above with reference to equation (1) and FIG. 2, the RTTs for the TODs and TOAs are derived. The individual RTTs for each exchange of ranging packet 112 and response packet 124 may be derived, or an average RTT for the burst may be derived. In some examples, if correlation is used, the additive sum of the correlations of the received burst of response packets 124 may be derived. The RTT derivations may be carried out by the processing circuitry 454 and/or the general purpose processor 470. At step 512 the residuals and the squared residuals, SR(rtt), are determined. The SR(rtt) is defined in equation (14) and the calculations can be performed by processing circuitry 454 and/or the general purpose processor 470.

At step 520, the corresponding response packets 124 are received and the AOAs are recorded. The response packets 124 can be received by wireless receiver 450, and the AOAs, as determined using the SBA 401, may be recorded in processing circuitry 454 together with the corresponding position of the measuring station 100. At step 521 the residuals and the squared residuals, SR(aoa), are determined. The SR(aoa) is defined in equation (23) and the calculations can be performed by processing circuitry 454 and/or the general purpose processor 470.

At step 530, SR(rtt) and SR(aoa) are summed to generate the combined squared residuals, $SR_1(sum)$, as defined in equation (24). At step 531, the minimum of the sum of the combined squared residuals SSR (sum) is calculated, as discussed above with reference to equation (26). At step 532, a determination is made whether a predefined minimum condition is met by the calculated minimum. In some examples, the predefined minimum condition includes a threshold that the value of the minimum is compared to. For example, if the value of the minimum is less than or equal to the threshold, it may be determined that the predefined minimum condition is met. At step 540, if the predefined minimum condition is not met (e.g., the value of the minimum is greater than the threshold), the Levenberg-Marquardt non-linear fitting scheme may be used to determine a next set of values for the a parameters (i.e., the location parameters for the target station 105). After completion of the calculations in step 540, the minimization process returns to steps 512 and 521. The Levenberg-Marquardt non-linear fitting scheme and the minimization process may be performed by the general purpose processor 470.

At step 532, if the predefined minimum condition is met, then at step 550 the CEP ellipse is calculated and displayed. In some examples, the general purpose processor 470 is configured to calculate and display the CEP ellipse. In some examples, the CEP ellipse is displayed via a display device controlled by the general purpose processor 470. Once step 550 is complete, method 500 returns to step 501.

Figure 6:
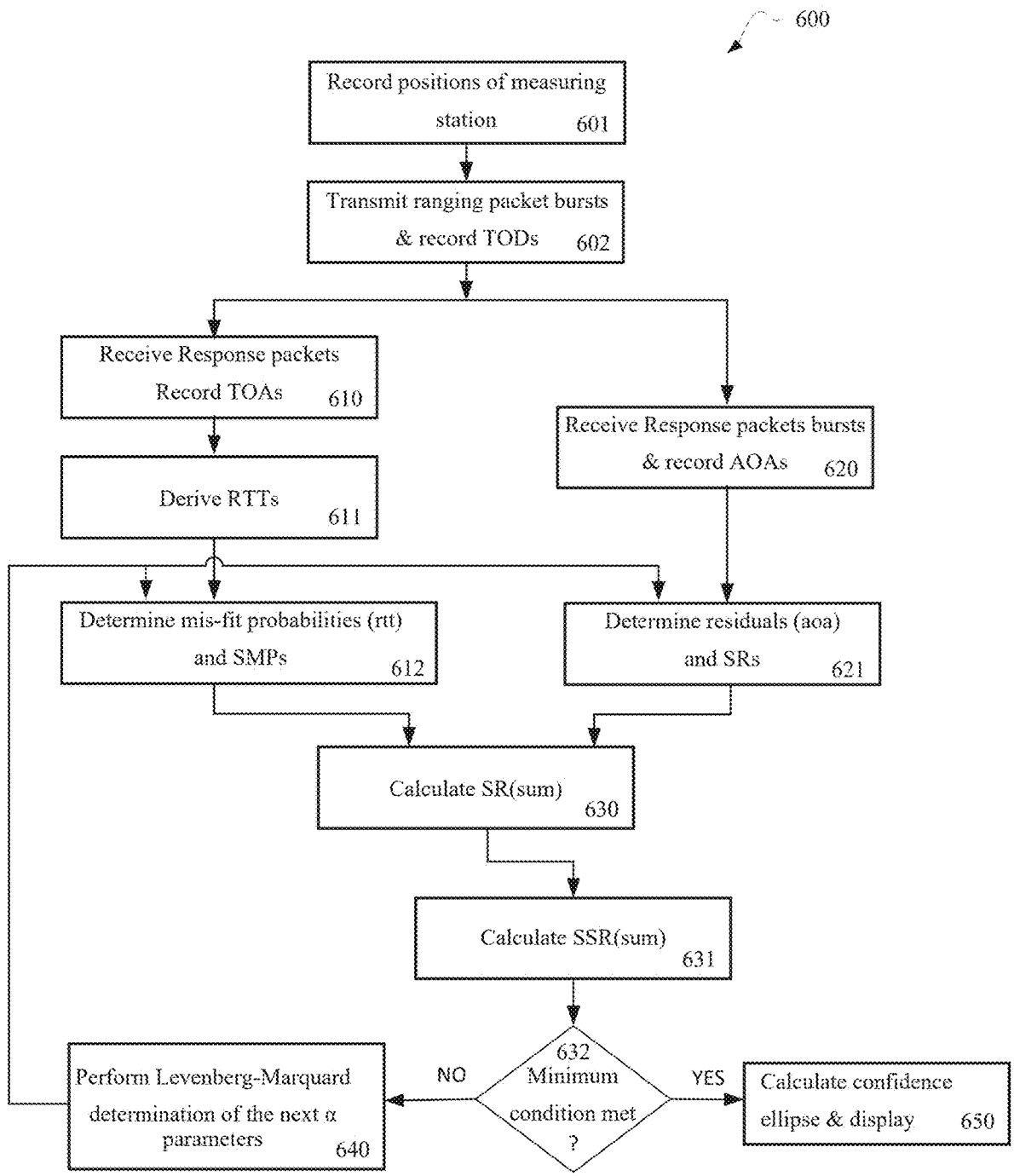
FIG. 6 is a flowchart of a method for determining the geo-location of a target station, in accordance with some embodiments.

FIG. 6 is a flowchart of another method 600, according to some embodiments, for determining the best-fit model for a set of RTTs and AOAs, and displaying the corresponding calculated CEP ellipse of the location of the target station 105.

At step 601, the location of the measuring target station 105 is recorded. The latitude, longitude, and optionally the altitude parameters may be obtained from the platform location module 460, and stored in the memory module 456 and/or the general purpose processor 470. At step 602, as discussed above with reference to FIG. 2, the measuring station 100 transmits a burst of ranging packets 112 and records the TODs of each packet. The bursts of ranging packets 112 may be configured by processing circuitry 420 and transmitted via RF transmitter 411 and SBA 401. The TODs may be received by wireless receiver 450 and recorded by processing circuitry 454. Step 602 may be followed by steps 610 and 620. In some examples, steps 610 and 620 are performed in parallel. In some examples, steps 610 and 620 are performed serially.

At step 610 the corresponding response packets 124 are received and the TOAs are recorded. The response packets 124 may be received by wireless receiver 450, and the TOAs may be recorded by processing circuitry 454 together with the corresponding TODs and the position of the measuring station 100, as recorded in steps 601 and 602. At step 611, as discussed above with reference to equation (1) and FIG. 2, the RTTs for the TODs and TOAs are derived. The individual RTTs for each exchange of ranging packet 112 and response packet 124 are derived, or an average RTT for the burst is derived. In some examples, if correlation is used, the additive sum of the correlations of the received burst of response packets 124 is derived. The RTT derivations are calculated by the processing circuitry 454 and/or the general purpose processor 470. At step 612, the mis-fit probabilities, MP(rtt), and the squared mis-fit probabilities, SMP(rtt), are determined. The SMP(rtt) is defined in equation (18) and the calculations may take place in processing circuitry 454 and/or the general purpose processor 470.

At step 620, the corresponding response packets 124 are received and the AOAs are recorded. The response packets 124 are received by wireless receiver 450 and the AOAs, as determined using the SBA 401, are recorded by processing circuitry 454 together with the corresponding position of the measuring station 100. At step 621, the residuals and the squared residuals, SR(aoa), are determined. The SR(aoa) is defined in equation (23) while the calculations are performed by processing circuitry 454 and/or the general purpose processor 470.

At step 630, SMP(rtt) and SR(aoa) are summed to generate the combined squared residuals, $SR_2(sum)$, as defined in equation (25). At step 631, the minimum of the sum of the combined squared residuals SSR (sum) is calculated, as discussed above with reference to equation (26). At step 632, it is determined whether a predefined minimum condition is met by the calculated minimum. In some examples, the predefined minimum condition includes a threshold that the value of the minimum is compared to. At step 640, if the predefined minimum condition is not met (e.g., the value of the minimum is greater than the threshold), the Levenberg-Marquardt non-linear fitting scheme is applied to determine a next set of values for the a parameters (i.e., the location parameters for the target station 105). After completion of the calculations in step 640, the minimization process returns to steps 612 and 621. According to some embodiments, the general purpose processor 470 can be configured to apply the Levenberg-Marquardt non-linear fitting scheme and the minimization process.

At step 632, if the predefined minimum condition is met, then at step 650, the CEP ellipse is calculated and displayed. In some examples, the general purpose processor 470 is configured to calculate the CEP ellipse. In some examples, the CEP ellipse is displayed via a display device controlled by the general purpose processor 470. Once step 650 is complete, method 600 returns to step 601.

As discussed above with reference to equations (24) and (25), the same set of a parameters (i.e., $\alpha^{LON}$, $\alpha^{LAT}$ and $\alpha^{ALT}$) are determined in step 540 (or step 640) and used for the determination of the SRs in steps 512 and 521 (or steps 612 and 621). The minimization, however, occurs in the SSR (sum). Hence, when one of the RTT and AOA results is less accurate, the SR with the better fit will automatically dominate the SSR (sum).

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which are executable via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowchart and/or block diagram block or blocks.

It is to be understood that the functions/acts noted in the blocks may occur in a different order than the one noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on a user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for example: the models used, the variables used, the initial parameters used, the measurement units used for the RTT and/or the AOA measurements, the value of σ in the fit probability equation FP, the details of the minimization of the SSR, the optionality of the altitude parameters, and the selection of the CEP co-ordinates. Accordingly, the scope should be determined not by the embodiments illustrated, but by the claims and their legal equivalents.

SOME EMBODIMENTS

Some embodiments may include any of the following:

A1. A method for determining a geo-location of a target station includes transmitting, from a measuring station, a plurality of ranging packets to a target station; receiving, at the measuring station, a plurality of response packets transmitted by the target station in response to the plurality of ranging packets; determining a plurality of round-trip times (RTTs) based on the plurality of ranging packets and the plurality of response packets, each RTT of the plurality of RTTs being a time elapsed between a transmission of a ranging packet and a reception of a corresponding response packet; and determining a plurality of angles of arrival (AOAs) based on the plurality of response packets, each AOA of the plurality of AOAs corresponding to an angle that a response packet was received at the measuring station. The method further includes calculating a first plurality of squared residuals for the plurality of RTTs; calculating a second plurality of squared residuals for the plurality of AOAs; generating a third plurality of squared residuals by summing the first and second pluralities; and calculating a minimum of a sum of the third plurality to identify best-fit location parameters for the target station. Additionally, the method includes generating a circular error probability (CEP) ellipse using the best-fit location parameters for the target station; and determining a geo-location of the target station based on the CEP ellipse.

A2. The method of clause A1 can include any of the following components or features, in any combination. Generating the third plurality includes applying a scaling factor to the second plurality to substantially balance contributions of the first and second pluralities when summing the first and second pluralities. The method can include determining a location of the measuring station at a time of receipt of each response packet of the plurality of response packets and appending location parameters to (i) each RTT of the plurality of RTTs and (ii) each AOA of the plurality of AOAs, the appended location parameters being associated with the location of the measuring station at the time of receipt of a respective response packet associated with each RTT and AOA. The method can further include determining first location parameters for the target station representing a starting location for the target station. Calculating the minimum includes calculating the minimum using the plurality of RTTs, the plurality of AOAs, the appended location parameters, and the first location parameters for the target station and determining whether a predefined condition is met by the minimum. The predefined condition includes a threshold for the minimum where the predefined condition is met when the minimum is less than or equal to the threshold. The method can include assigning the first location parameters for the target station as the best-fit location parameters for the target station in response to determining that the predefined condition is met. The method can further include calculating second location parameters for the target station in response to determining that the predefined condition is not met and recalculating the minimum using the plurality of RTTs, the plurality of AOAs, the appended location parameters, and the second location parameters for the target station. The minimum is iteratively calculated until the predefined condition is met. Calculating the second location parameters for the target station include using a non-linear fitting scheme.

A3. A system for determining a geo-location of a target station includes at least one memory device with computer-executable instructions stored thereon. The computer-executable instructions when executed by at least one processor, causes the at least one processor to perform operations that include transmitting, from a measuring station, a plurality of ranging packets to a target station; receiving, at the measuring station, a plurality of response packets transmitted by the target station in response to the plurality of ranging packets; determining a plurality of round-trip times (RTTs) based on the plurality of ranging packets and the plurality of response packets, each RTT of the plurality of RTTs being a time elapsed between a transmission of a ranging packet and a reception of a corresponding response packet; and determining a plurality of angles of arrival (AOAs) based on the plurality of response packets, each AOA of the plurality of AOAs corresponding to an angle that a response packet was received at the measuring station. The operations further include calculating a first plurality of squared residuals for the plurality of RTTs; calculating a second plurality of squared residuals for the plurality of AOAs; generating a third plurality of squared residuals by summing the first and second pluralities; and calculating a minimum of a sum of the third plurality to identify best-fit location parameters for the target station. Additionally, the operations include generating a circular error probability (CEP) ellipse using the best-fit location parameters for the target station; and determining a geo-location of the target station based on the CEP ellipse.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for determining a geo-location of a target station, the method comprising:
    transmitting, from a measuring station, a plurality of ranging packets to a target station;
    receiving, at the measuring station, a plurality of response packets transmitted by the target station in response to the plurality of ranging packets;
    determining a plurality of round-trip times (RTTs) based on the plurality of ranging packets and the plurality of response packets, each RTT of the plurality of RTTs being a time elapsed between a transmission of a ranging packet and a reception of a corresponding response packet;
    determining a plurality of angles of arrival (AOAs) based on the plurality of response packets, each AOA of the plurality of AOAs corresponding to an angle that a response packet was received at the measuring station;
    calculating a first plurality of squared misfit probabilities for the plurality of RTTs;
    calculating a first plurality of squared residuals for the plurality of AOAs;
    generating a second plurality of squared residuals by summing the first pluralities;
    calculating a minimum of a sum of the second plurality to identify best-fit location parameters for the target station;
    generating a circular error probability (CEP) ellipse using the best-fit location parameters for the target station; and
    determining a geo-location of the target station based on the CEP ellipse.

2. The method of claim 1, wherein generating the second plurality comprises applying a scaling factor to the first plurality of squared residuals to substantially balance contributions of the first pluralities when summing the first pluralities.

3. The method of claim 1, further comprising:
    determining a location of the measuring station at a time of receipt of each response packet of the plurality of response packets;
    appending location parameters to (i) each RTT of the plurality of RTTs and (ii) each AOA of the plurality of AOAs, the appended location parameters being associated with the location of the measuring station at the time of receipt of a respective response packet associated with each RTT and AOA.

4. The method of claim 3, further comprising:
    determining first location parameters for the target station, the first location parameters representing a starting location for the target station.

5. The method of claim 4, wherein calculating the minimum comprises:
    calculating the minimum using the plurality of RTTs, the plurality of AOAs, the appended location parameters, and the first location parameters for the target station; and
    determining whether a predefined condition is met by the minimum.

6. The method of claim 5, wherein the predefined condition includes a threshold for the minimum, the predefined condition is met when the minimum is less than or equal to the threshold.

7. The method of claim 5, further comprising:
    in response to determining that the predefined condition is met, assigning the first location parameters for the target station as the best-fit location parameters for the target station.

8. The method of claim 5, further comprising:
    in response to determining that the predefined condition is not met, calculating second location parameters for the target station; and
    recalculating the minimum using the plurality of RTTs, the plurality of AOAs, the appended location parameters, and the second location parameters for the target station.

9. The method of claim 8, wherein the minimum is iteratively calculated until the predefined condition is met.

10. The method of claim 8, wherein calculating the second location parameters for the target station comprises using a non-linear fitting scheme.

11. A system for determining a geo-location of a target station, the system comprising:
    at least one memory device with computer-executable instructions stored thereon; and
    at least one processor for executing the computer-executable instructions stored on the at least one memory device, wherein execution of the computer-executable instructions by the at least one processor causes the at least one processor to perform operations comprising:

transmitting, from a measuring station, a plurality of ranging packets to a target station;

receiving, at the measuring station, a plurality of response packets transmitted by the target station in response to the plurality of ranging packets;

determining a plurality of round-trip times (RTTs) based on the plurality of ranging packets and the plurality of response packets, each RTT of the plurality of RTTs being a time elapsed between a transmission of a ranging packet and a reception of a corresponding response packet;

determining a plurality of angles of arrival (AOAs) based on the plurality of response packets, each AOA of the plurality of AOAs corresponding to an angle that a response packet was received at the measuring station;

calculating a first plurality of squared misfit probabilities for the plurality of RTTs;

calculating a first plurality of squared residuals for the plurality of AOAs;

generating a second plurality of squared residuals by summing the first pluralities;

calculating a minimum of a sum of the second plurality to identify best-fit location parameters for the target station;

generating a circular error probability (CEP) ellipse using the best-fit location parameters for the target station; and determining a geo-location of the target station based on the CEP ellipse.

12. The system of claim 11, wherein generating the second plurality comprises applying a scaling factor to the first plurality of squared residuals to substantially balance contributions of the first pluralities when summing the first pluralities.

13. The system of claim 11, wherein execution of the computer-executable instructions further cause the at least one processor to perform operations comprising:

determining a location of the measuring station at a time of receipt of each response packet of the plurality of response packets;

appending location parameters to (i) each RTT of the plurality of RTTs and (ii) each AOA of the plurality of AOAs, the appended location parameters being associated with the location of the measuring station at the time of receipt of a respective response packet associated with each RTT and AOA.

14. The system of claim 13, wherein execution of the computer-executable instructions further cause the at least one processor to perform operations comprising:

determining first location parameters for the target station, the first location parameters representing a starting location for the target station.

15. The system of claim 14, wherein calculating the minimum comprises:

calculating the minimum using the plurality of RTTs, the plurality of AOAs, the appended location parameters, and the first location parameters for the target station; and determining whether a predefined condition is met by the minimum.

16. The system of claim 15, wherein the predefined condition includes a threshold for the minimum, the predefined condition is met when the minimum is less than or equal to the threshold.

17. The system of claim 15, wherein execution of the computer-executable instructions further cause the at least one processor to perform operations comprising:

in response to determining that the predefined condition is met, assigning the first location parameters for the target station as the best-fit location parameters for the target station.

18. The system of claim 15, wherein execution of the computer-executable instructions further cause the at least one processor to perform operations comprising:

in response to determining that the predefined condition is not met, calculating second location parameters for the target station; and recalculating the minimum using the plurality of RTTs, the plurality of AOAs, the appended location parameters, and the second location parameters for the target station.

19. The system of claim 18, wherein the minimum is iteratively calculated until the predefined condition is met.

20. The system of claim 18, wherein calculating the second location parameters for the target station comprises using a non-linear fitting scheme.

* * * * *